United States Patent
Mathur

(10) Patent No.: US 9,223,473 B2
(45) Date of Patent: Dec. 29, 2015

(54) SUPPLEMENTAL SERVICES INTERFACE

(71) Applicant: Arpit Mathur, Philadelphia, PA (US)

(72) Inventor: Arpit Mathur, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 258 days.

(21) Appl. No.: 13/799,434

(22) Filed: Mar. 13, 2013

(65) Prior Publication Data
US 2014/0282122 A1  Sep. 18, 2014

(51) Int. Cl.
| | | |
|---|---|---|
| *G06F 3/00* | (2006.01) | |
| *G06F 3/0482* | (2013.01) | |
| *H04N 5/445* | (2011.01) | |
| *H04N 21/235* | (2011.01) | |
| *H04N 21/2665* | (2011.01) | |
| *H04N 21/426* | (2011.01) | |
| *H04N 21/431* | (2011.01) | |
| *H04N 21/435* | (2011.01) | |
| *H04N 21/462* | (2011.01) | |
| *H04N 21/472* | (2011.01) | |
| *H04N 21/4722* | (2011.01) | |
| *H04N 21/4782* | (2011.01) | |
| *H04N 21/482* | (2011.01) | |
| *H04N 21/485* | (2011.01) | |
| *H04N 21/81* | (2011.01) | |

(52) U.S. Cl.
CPC .......... *G06F 3/0482* (2013.01); *H04N 5/44543* (2013.01); *H04N 21/235* (2013.01); *H04N 21/2665* (2013.01); *H04N 21/42676* (2013.01); *H04N 21/435* (2013.01); *H04N 21/4312* (2013.01); *H04N 21/4314* (2013.01); *H04N 21/4622* (2013.01); *H04N 21/4722* (2013.01); *H04N 21/4782* (2013.01); *H04N 21/47202* (2013.01); *H04N 21/485* (2013.01); *H04N 21/4821* (2013.01); *H04N 21/8133* (2013.01); *G06F 2203/04803* (2013.01); *H04N 21/4828* (2013.01)

(58) Field of Classification Search
CPC ..................................................... G06F 3/0481
USPC .......................................................... 715/762
See application file for complete search history.

(56) References Cited

U.S. PATENT DOCUMENTS

| | | | | |
|---|---|---|---|---|
| 6,822,661 | B2* | 11/2004 | Sai et al. ........................ | 715/716 |
| 7,350,157 | B1* | 3/2008 | Billmaier et al. ............. | 715/818 |
| 7,702,337 | B2* | 4/2010 | Vare ....................... | H04H 60/37 370/338 |
| 9,098,163 | B2* | 8/2015 | Kuo ..................... | H04N 5/4403 1/1 |
| 2003/0088612 | A1* | 5/2003 | Goldschmidt Iki et al. .. | 709/202 |
| 2006/0053470 | A1* | 3/2006 | Colter et al. ................... | 725/135 |
| 2006/0253782 | A1* | 11/2006 | Stark et al. .................... | 715/727 |

(Continued)

OTHER PUBLICATIONS

Remote Desktop Services Virtual Channels, <http://msdn.microsoft.com/en-us/library/windows/desktop/aa383509(v=vs.85).aspx[Sep. 27, 2012 9:23:32 AM], 2 pages.

*Primary Examiner* — William Titcomb
(74) *Attorney, Agent, or Firm* — Banner & Witcoff, Ltd.

(57) ABSTRACT

Examples are described for integrating interface functionality with other experiences. For example, if a user is interested in a particular item of scheduled or on-demand content (e.g., a television series episode), the user may also be interested in a web page devoted to the television series and/or other extras such as cast interviews, news, related theme apps, and the like. These types of experiences may be integrated into an interface by presenting the experiences as supplemental services that may be presented and/or selected.

20 Claims, 11 Drawing Sheets

(56) References Cited

U.S. PATENT DOCUMENTS

| | | | |
|---|---|---|---|
| 2009/0119335 A1* | 5/2009 | Ide et al. | 707/104.1 |
| 2010/0031193 A1* | 2/2010 | Stark et al. | 715/810 |
| 2010/0122305 A1* | 5/2010 | Moloney | 725/93 |
| 2010/0138764 A1* | 6/2010 | Hatambeiki et al. | 715/765 |
| 2010/0229126 A1* | 9/2010 | Mihara et al. | 715/841 |
| 2010/0235781 A1* | 9/2010 | Friedlander et al. | 715/803 |
| 2011/0154404 A1* | 6/2011 | Piepenbrink et al. | 725/53 |
| 2012/0110457 A1* | 5/2012 | Friedlander et al. | 715/728 |
| 2013/0232417 A1* | 9/2013 | Hunleth et al. | 715/717 |
| 2014/0229836 A1* | 8/2014 | Young | 715/721 |

* cited by examiner

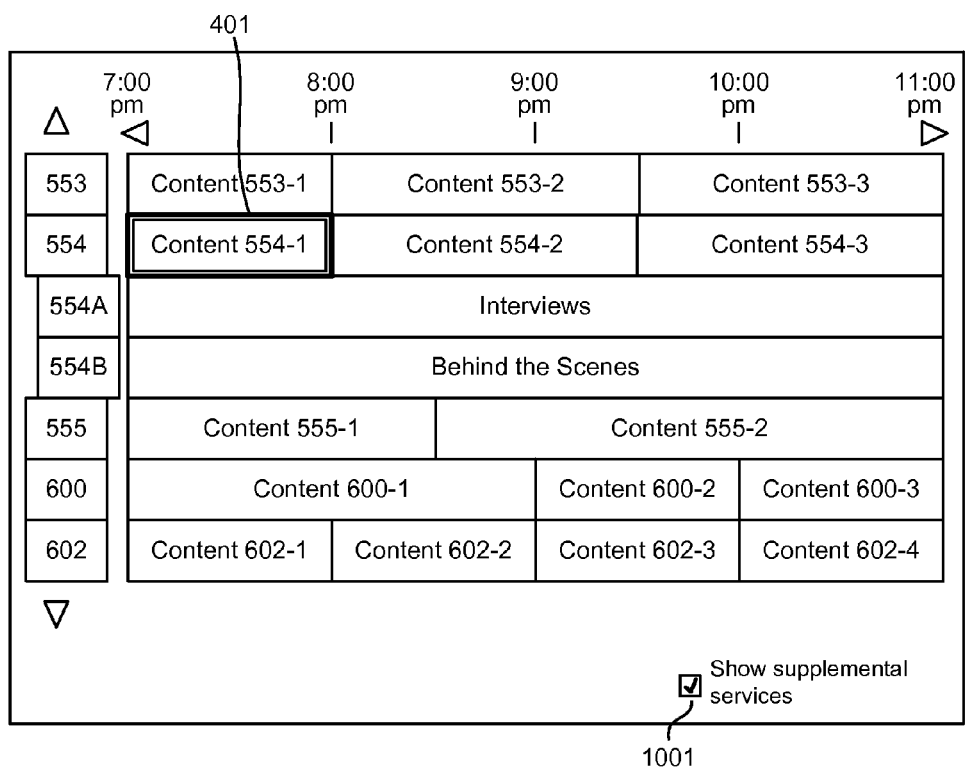

SUPPLEMENTAL SERVICES INTERFACE

BACKGROUND

Interfaces such as program guides for finding scheduled and on-demand multimedia content are ubiquitous. In many cases, program guides are provided through devices that have additional functionality such as a web browser and the ability to download and execute user-selected apps. However, it is typically inconvenient for a user to move between the program guide and other interfaces to access functions.

SUMMARY

It may be desirable to better integrate standard interface, e.g., program guide, functionality with other experiences. For example, if a user is interested in a particular item of scheduled or on-demand content (e.g., a television series episode), the user may also be interested in a web page devoted to that content (e.g., the television series) and/or other extras such as cast interviews, news, related theme apps, and the like. These types of experiences may be integrated into an interface such as a program guide by presenting the experiences as supplemental services and/or content listings (e.g., as one or more supplemental channels) that may be presented and/or selected in a manner similar to or the same as any of the other service listings presented in the main interface.

According to an aspect as described herein, methods, apparatuses, and software may perform, for example, at least the following process. It may be determined whether a first one of a plurality of items of scheduled content (e.g., linear television content) of a first one of a plurality of services is associated with another one or more services not included in the plurality of services. Responsive to determining that the first one of the items of scheduled content is associated with said another one or more services, an interface may be generated for use and/or display to indicate at least some of the items of scheduled content, including the first item of scheduled content as well as at least one item of content of the another one or more services.

In another aspect, a user selection of a first item of content of a first service may be received, and a different second item of content of a different second service may be determined based at least in part on the first item of content. An interface may be generated for use and/or display to indicate a plurality of items of content for a plurality of services including the first and second items of content and the first and second services.

In yet another aspect, an interface may be generated for user and/or display to indicate a plurality of items of content, including a first item of content, for a plurality of services including a first service. A user selection may be received, which may indicate a first one of the indicated items of content that is scheduled on a first one of the indicated services. Responsive to the user selection, a second service not shown or otherwise indicated by the interface may be determined based at least in part on the first item of content and/or the first service. An updated interface may be generated for use and/or display to indicate the plurality of items of content for the plurality of services, and to further indicate the second service.

These features are merely examples, and further features and details are discussed below.

BRIEF DESCRIPTION OF THE DRAWINGS

Some features herein are illustrated by way of example, and not by way of limitation, in the figures of the accompanying drawings and in which like reference numerals refer to similar elements.

FIG. 16 shows an example interface in accordance with one or more aspects as described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
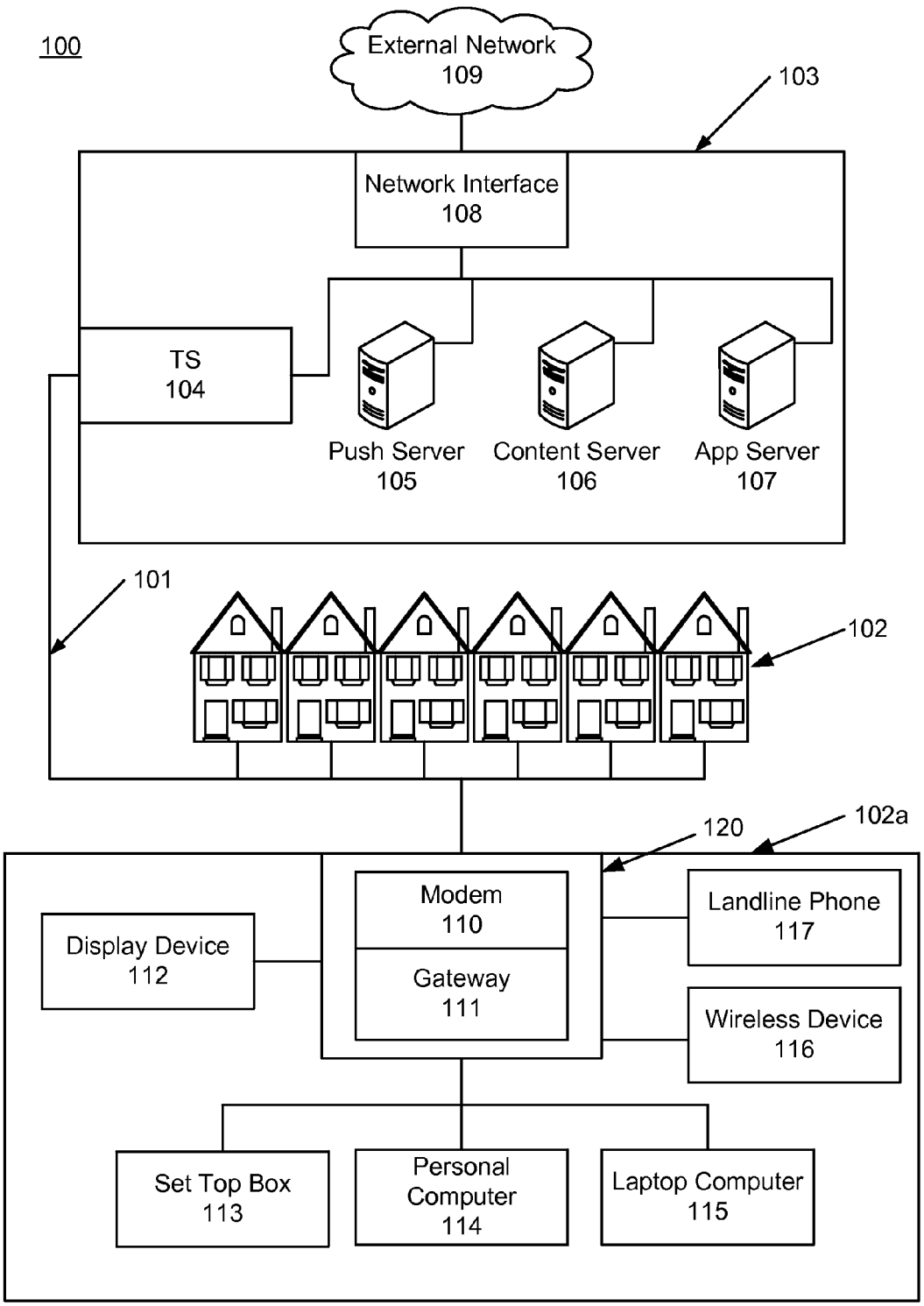
FIG. 1 illustrates an example access and information distribution network.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office (e.g., headend) 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic content listings, such as in the form of program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs 112, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
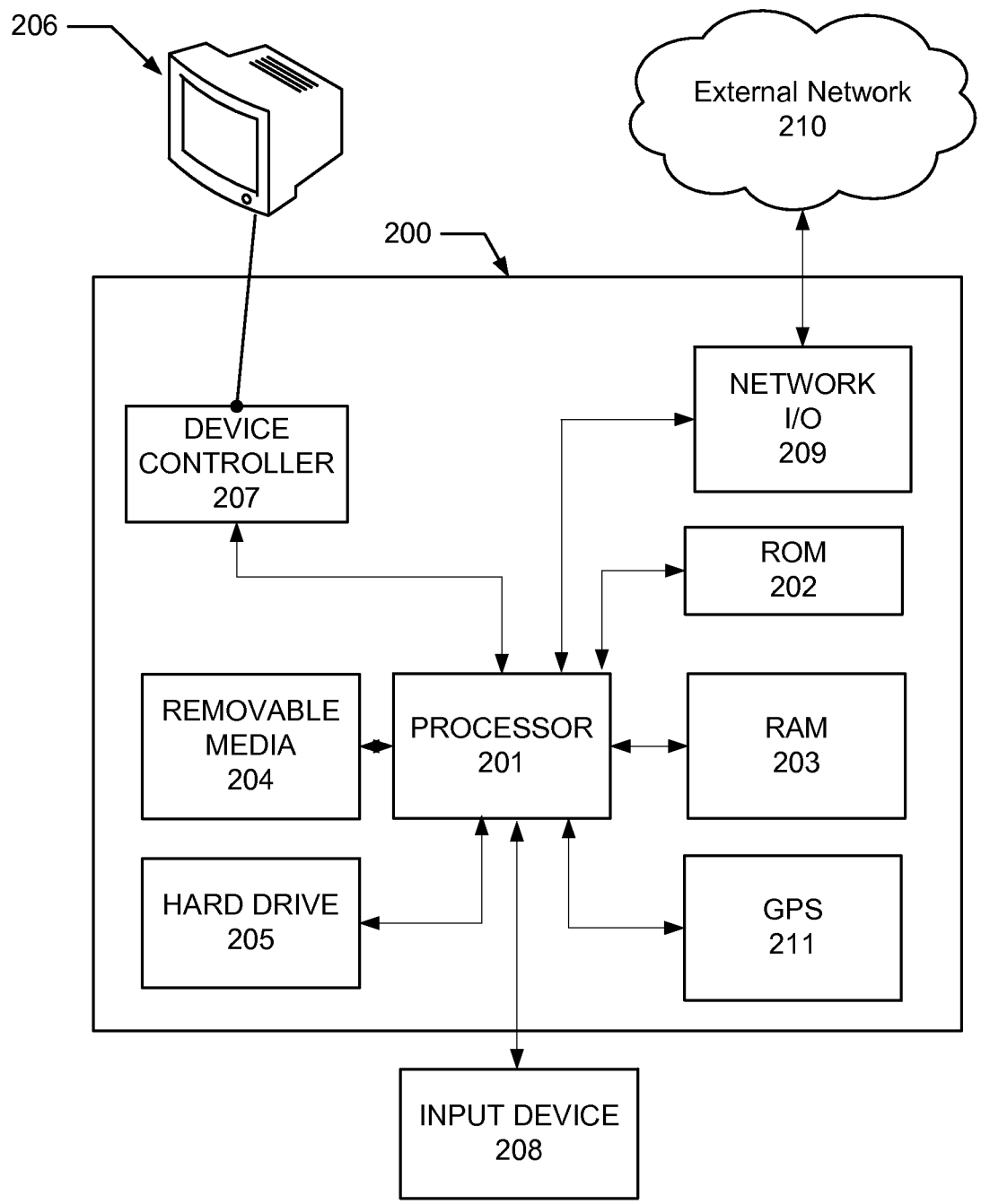
FIG. 2 illustrates an example hardware and/or software platform on which the various elements described herein can be implemented in accordance with one or more aspects as described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/ output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3A:
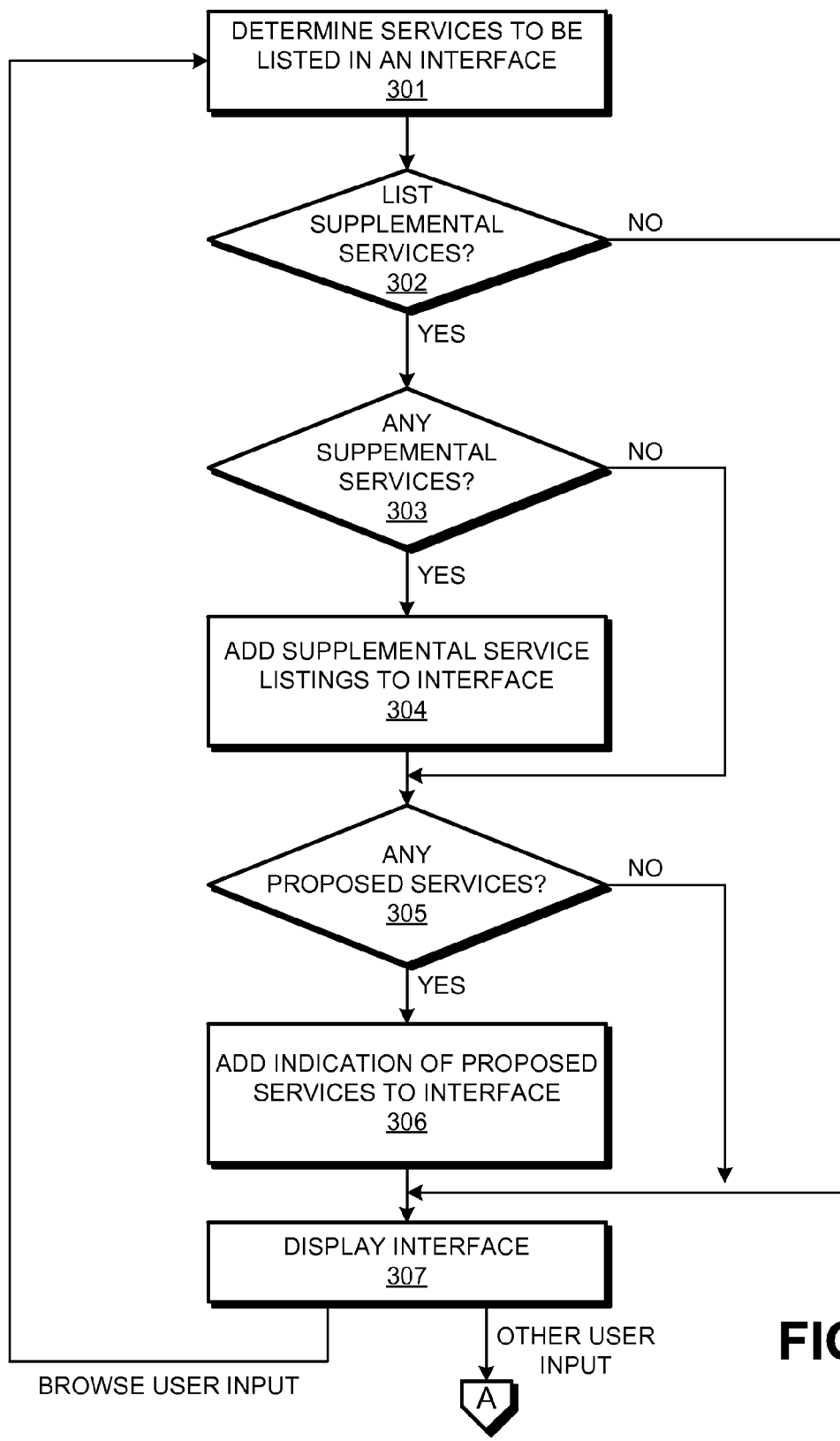
FIGS. 3A and 3B are flow charts of an example method that may be performed in accordance with one or more aspects as described herein.
Figure 3B:
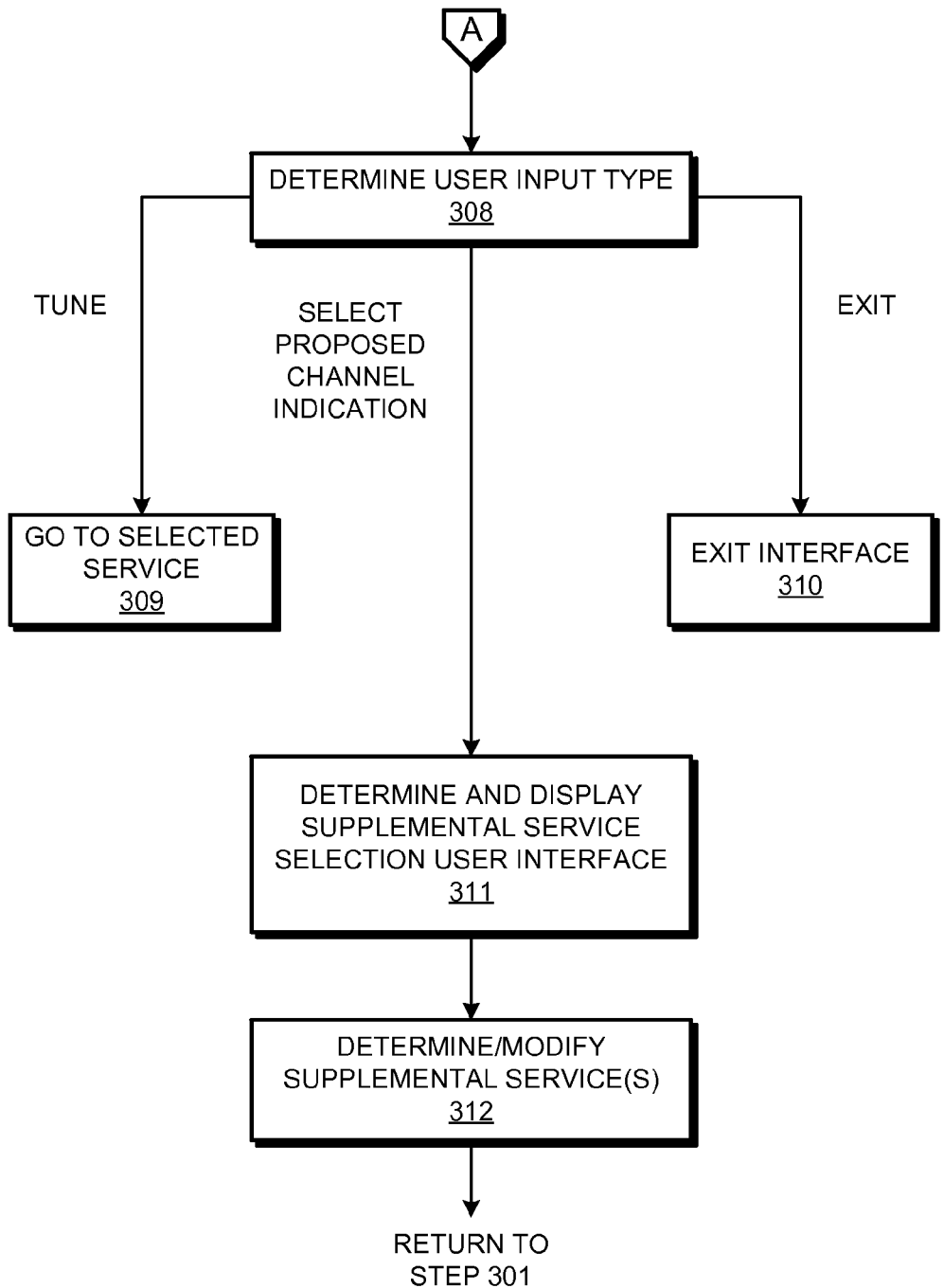

FIGS. 3A and 3B are flow charts of an example method that may be performed in accordance with one or more aspects as described herein. The method includes steps that may be used for, e.g., determining and/or presenting various user interfaces by a computing device, including one or more user interfaces such as a program guide user interface and/or a supplemental service selection user interface. The various steps in this flow chart may be performed by one or more devices and/or humans, such as any of the elements of FIGS. 1 and 2. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

In general, FIG. 3A shows example steps that may be performed to determine and present an interactive user interface such as an interactive electronic program guide, and FIG. 3B shows examples steps that may be performed to determine and present a supplemental service selection user interface, and to add or otherwise modify which supplemental services are to be presented in the user interface. Supplemental services may provide any type of experience, such as but not limited to on-demand multimedia (e.g., audio and/or video) content; a link to a web site; a downloadable and/or installable app (software application), or an app that has already been downloaded and installed; news; a photo slide show; and the like. The experience may be related to another service and/or another item of content on the other service that is listed in the interface. For example, a supplemental service may be associated with one or more particular items of content (e.g., an item of scheduled content and/or an on-demand item of content) and/or one or more particular services that may be listed in the interface. For example, if a user is interested in a particular item of scheduled or on-demand content (e.g., a television series episode), the user may also be interested in a web page devoted to the television series and/or other extras such as cast interviews, news, related theme apps, and the like. These types of experiences may be integrated into an interface by presenting the experiences as supplemental services (e.g., channels) that may be listed and/or selected in a manner similar to or the same as any of the other services (e.g., channels) presented in the interface.

Examples of how an interface, such as a program guide, may be displayed are described in connection with, e.g., FIGS. 4-13 and 16, and examples of how a supplemental service selection user interface may be displayed are described in connection with, e.g., FIGS. 14 and 15. It will be understood, however, that both the main interface and the supplemental service selection user interface may have different appearances from those shown in the figures herein, depending upon the implementations thereof.

In the following explanation, certain steps of FIGS. 3A and 3B may be described as being performed by a particular device or system. However, these are merely examples and that any or all of the steps may be performed by any other devices or systems. For instance, the content and/or layout of the interface to be displayed may be determined at the service provider side by any of the servers 105-107, and the user computing device (e.g., any of the devices at the home 102a) may simply present the determined interface. As another example, the content and/or layout of the interface to be displayed may be partially or fully locally determined by the user computing device. In the latter example, although the particular portion of information to be displayed may be determined by the user computing device, the content information library may be provided by the service provider, such as by any of the servers 105-107.

At step 301, the user computing device and/or any of the servers 105-107 may determine services and timeframes to be displayed in the interface. Step 301 may be performed, for instance, in response to a user request to view the interface, or automatically such as upon returning from another user interface. The interface may include information about which programs (e.g., audio and/or video content, and/or any other content) are scheduled to be provided on which services at which times. Many program guides that provide such schedule information are provided in a two-dimensional grid format, with a listing of services along one axis and a listing of times along the other axis, and where the items of content are indicated at the appropriate intersections of the listed services and the listed times. While the interface herein may be presented in such a two-dimensional grid format, the interface may have any other layout or other configuration as desired, such as in the form of a three-dimensional grid guide or even in a non-grid format.

Figure 4:
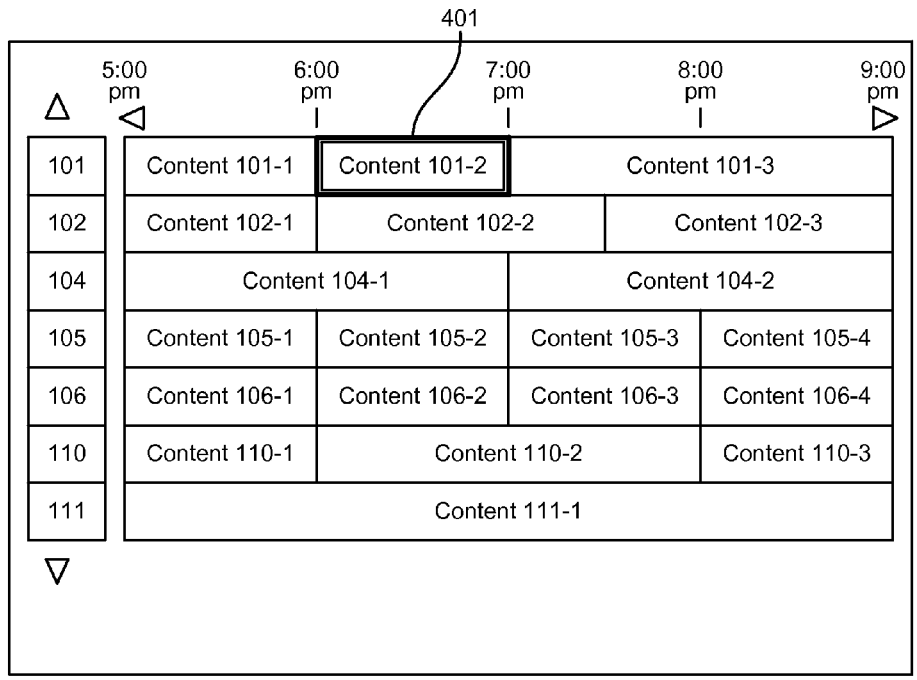
FIG. 4 shows an example interface in accordance with one or more aspects as described herein.

A screenshot of an example of a grid format interface, such as a program guide, is shown in FIG. 4. In this example, the service listing is arranged along the vertical axis of the guide and the timeframe is arranged along the horizontal axis of the guide. In other examples, the horizontal and vertical axes may be reversed such that service listing is arranged along the horizontal axis and the timeframe is arranged along the vertical axis. In this example, the services listed are service numbers (e.g., channel numbers) 101, 102, 104, 105, 106, 110, and 111, and the timeframe displayed is from 5:00 pm to 9:00 pm. However, the total guide information that is available may include other services and/or times in addition to those that are currently being displayed. It is noted that the service numbering and timeframe in this example are arbitrary; any other times and/or services may be included. Moreover, services need not necessarily be designated in the interface by number; they may be designated using any other naming convention desired, such as by using any alphabetical, alphanumeric, graphical, and/or symbolic designation of the services.

The displayed interface shown by way of example in FIG. 4 may also include indications of which items of content scheduled to be presented by the services. Examples of items of scheduled content may include, but are not limited to, television series, movies, live broadcasts (e.g., sports or other live performances, or other live video feeds), documentaries, news, informational screens (e.g., weather, emergency information, etc.), interactive content such as video games, etc. Each item of scheduled content may have a title or other identifier, each of which may be indicated by the displayed interface. These content identifiers are shown in a generic way in FIG. 4 as "Content 101-1," "Content 101-2", etc. The identifiers may be text, graphics, video, and/or in any other format. Some or all of the items of content may be scheduled—that is, an item of scheduled content that may be scheduled to be presented on a predetermined service (e.g., channel) at a predetermined start time and/or end at a predetermined end time. The locations of those items of scheduled content may be presented at locations in the displayed interface that depend upon which services and/or times the items are scheduled for. For example, the item labeled in FIG. 4 as "Content 101-1" is scheduled to be presented on service number 101 starting at 5:00 pm and ending at 6:00 pm, and the item labeled as "Content 110-2" is scheduled to be presented on service number 110 starting at 6:00 pm and ending at 8:00 pm. One or more of the services may include unscheduled content. For example, service number 111 as indicated by the interface of FIG. 4 may be an on-demand service that presents content dynamically in response to a user selection of the content, rather than at a predetermined scheduled time.

Figure 5:
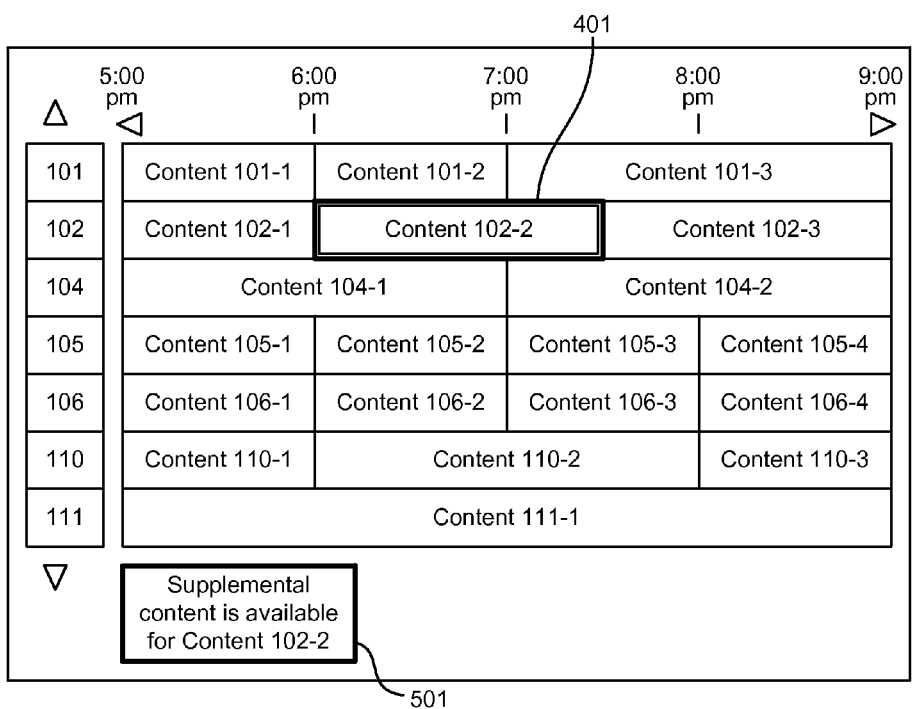
FIG. 5 shows an example interface in accordance with one or more aspects as described herein.

The particular services and/or times listed in the presented interface or portion thereof (as determined at step 301) may depend upon any of various factors. For instance, the interface as displayed may default to a timeframe window that includes the current time (where the start and/or end times of the displayed timeframe window may depend upon the current time), and/or to a default subset of the services. Moreover, the interface to be displayed may include a subset of the services and a particular timeframe that depends upon a user selection. In the case of a grid-style interface, a user-movable selection cursor may be displayed, that the user may move (e.g., up, down, left, and right) to highlight one program at a time. For instance, referring to the example of FIG. 4, a cursor 401 may be moveable by the user and may be used to highlight and/or select a particular program, service, and/or time. For example, FIG. 5 shows the cursor 401 after it has moved down in the interface. As appropriate, the subset of services and/or the timeframe window may also change with such user input to allow other services and/or times to be included in the displayed interface. However, programs, services, and/or times may be selected in any manner as desired, depending upon the implementation. Where the interface is controlled by the user via a remote control (e.g., the remote control 118) and/or by physical or virtual buttons in general, the buttons may include at least an up, down, left, and right buttons, as well as a selection (e.g., "enter") button, for moving the selection cursor through the interface and for making a selection of the highlighted program. Where the interface is presented on a touch screen, the user may be able to select virtual (e.g., displayed) buttons and/or simply touch a particular displayed program on the interface to select the program.

As mentioned above, the services to be listed in the presented interface may include one or more supplemental services that may be associated with one or more other services and/or items of content (scheduled or unscheduled) of those one or more other services. A user may install/subscribe to a particular supplemental service that is associated with another service and/or item of content of another service, and the supplemental service may or may not be included in the displayed interface depending upon one or more factors, such as whether supplemental services are to be listed by the displayed interface at all and/or whether the associated service and/or item of content is included in the displayed portion of the interface.

Referring again to the process of FIG. 3A, at step 302, it may be determined (e.g., by the user device and/or by any device in the network) whether the aforementioned supplemental services should be included at all in the displayed interface. This decision may be based upon, for example, a predetermined user preference or a user input to the interface. For example, referring to FIG. 10, the interface may include a checkbox 1001 or other user input means for allowing the user to indicate whether supplemental services are to be included.

If the decision at step 302 is not to include supplemental services in the displayed interface, then the process may move to step 307, at which point the determined interface may be generated for display on a display device such as, e.g., in the form of graphical data (e.g., vector data), as bitmapped image data, as text data (e.g., ASCII code), other data, as an analog or digital video signal, etc. The generation of such information and/or the signal representing the interface to be displayed may be performed by the user device and/or by a device of the network.

If the decision at step 302 is that supplemental services are to be included in the displayed interface, then the process may move to step 303, at which point it may be determined (e.g., by the user device or a device of the network) whether any supplemental services exist that are appropriate for inclusion in the displayed interface. For example, there may be no supplemental services at all. Or, while there may be supplemental services, less than all (or even none) of the supplemental services may be services that are within the displayed portion of the interface. This determination may change depending upon, for example, which portion of the interface is to be displayed at a particular moment. For example, if in the example of FIG. 4, there is a supplemental service that is intended to be displayed in association with service number 102 (which is listed in the displayed interface), then it may be appropriate to determine that the associated supplemental service should also be displayed. However, if there is a supplemental service that is intended to be displayed in association with an un-displayed service (e.g., service number 112), then in the FIG. 4 example, neither service number 112 nor its associated supplemental service may be listed unless and until service number 112 is included in the displayed portion of the interface. If, at step 303, it is determined that there are no supplemental services to be listed in the interface at this time, then the process may move to step 307.

If, on the other hand, it is determined at step 303 that one or more supplemental services are to be listed in the displayed interface, then the process may move to step 304. At step 304, the user device and/or a device of the network may add the one or more determined supplemental services to the interface that is to be displayed. In generating the interface to be displayed, the user device and/or the network device may generate a display window data set of the services, the times, and/or the program titles to be included in the portion (window) of the interface to be displayed. Thus, step 304 may involve adding such supplemental service(s) and/or the associate titles for the supplemental service(s) to the display window data set.

At step 305, the user device and/or a device of the network may determine whether there are any other supplemental services that the user may be interested in installing (and that the user may not have already installed). For example, if there is a particular proposed service that is associated with one of the services in the interface to be displayed (e.g., already in the aforementioned display window data set), then it may be determined that the associated service should be indicated to the user as being potentially a service of interest to the user. Thus, the proposed services identified at step 305 may depend upon which other services are included in the interface to be displayed.

Figure 6:
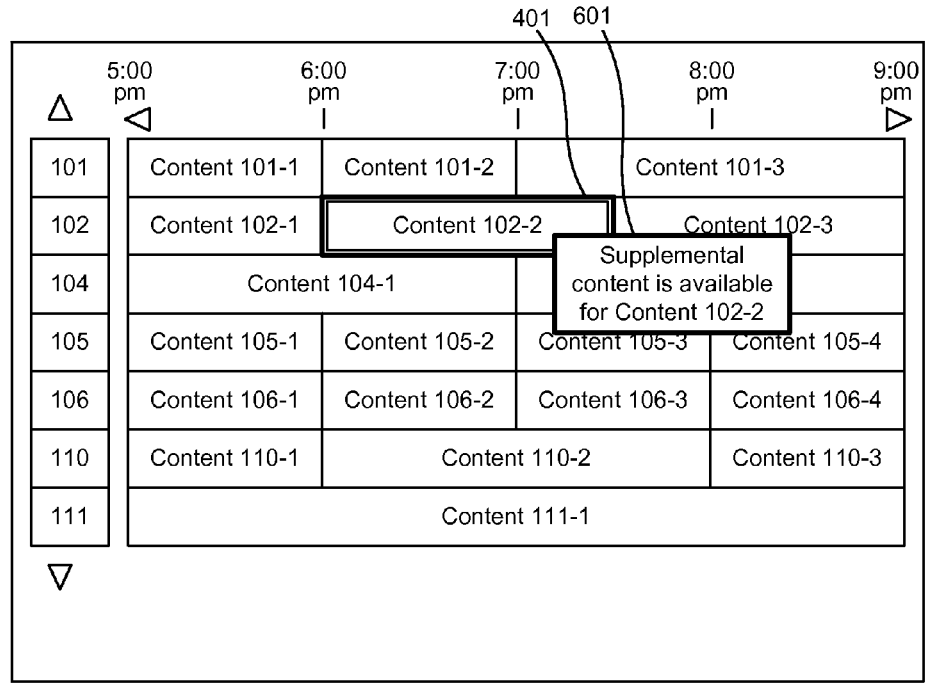
FIG. 6 shows an example interface, in accordance with one or more aspects as described herein.
Figure 7:
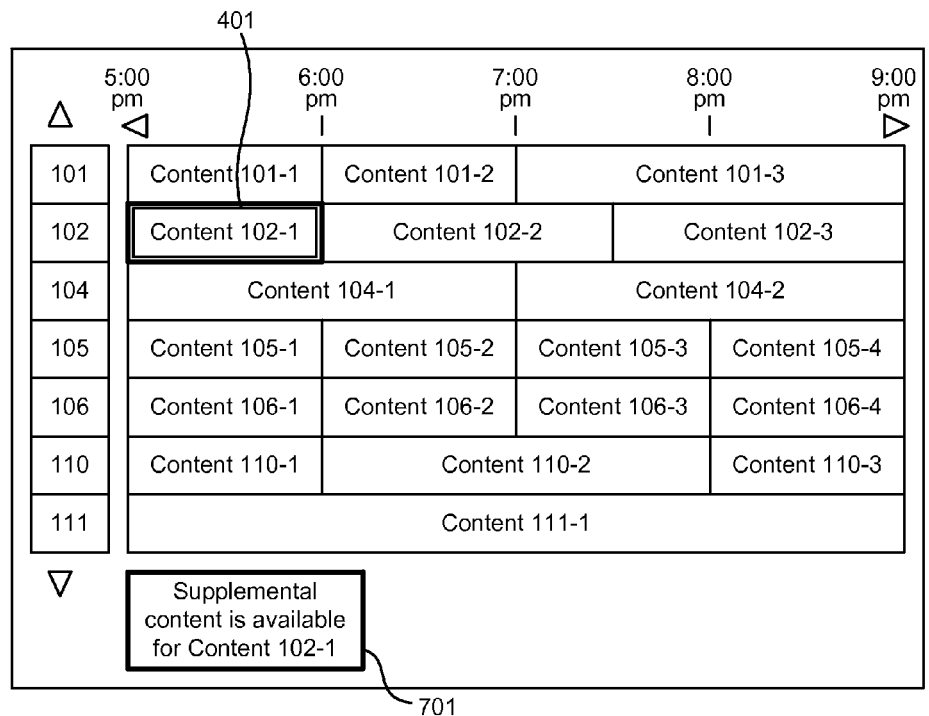
FIG. 7 shows an example interface in accordance with one or more aspects as described herein.
Figure 8:
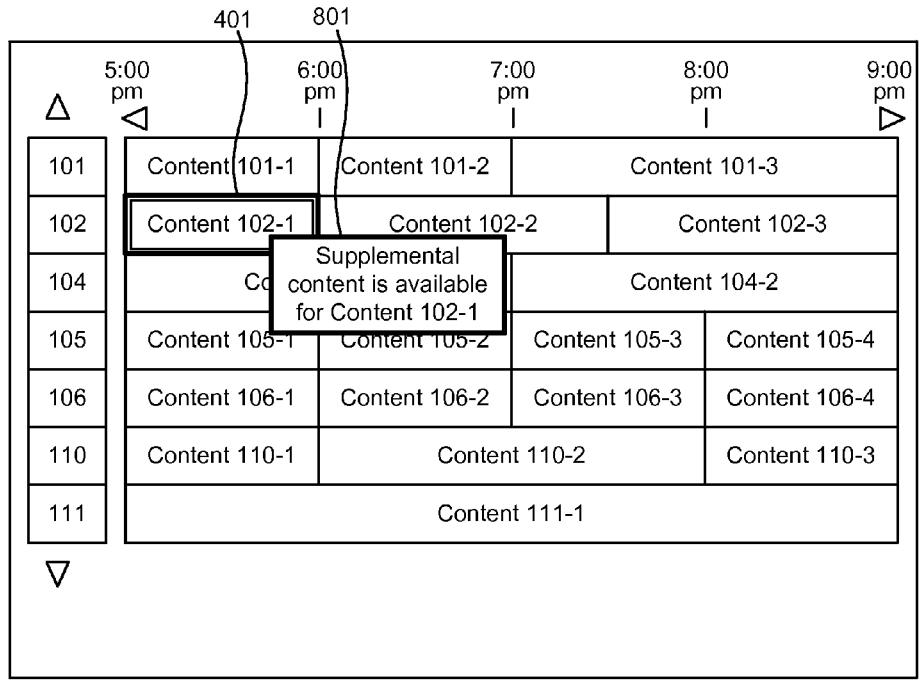
FIG. 8 shows an example interface in accordance with one or more aspects as described herein.

At step 306, if there are any proposed services that have been identified in step 305, then an indication of those proposed services may be added to the interface to be identified (e.g., added to the display window data set). As an example, FIG. 5 shows a message 501 indicating that supplemental content (e.g., supplemental services that may be installed) is available for a program referred to herein as Content 102-2. As another example, FIG. 6 shows a message 601 indicating that supplemental content is available for Content 102-2. In this example, the message 601 may be presented at a location that depends upon the location of the listing of the associated content (in this example, Content 102-2) in the interface to be displayed and/or upon the location of the service listing of the associated content (in this example, service number 102) in the interface to be displayed. In order to determine whether supplemental content is associated with a service or with an item of content, a supplemental content data set may be maintained and updated by the user device and/or by a device of the network. The supplemental content data set may associate one or more items of supplemental content with one or more items of content and/or one or more services. Thus, step 306 may involve referring to the supplemental content data set to determine whether any of the services and/or items of content that are to be included in the displayed interface are associated with any supplemental content. If so, then one or more messages for the supplemental content may be added to the display window data set.

For example, as shown in FIG. 6, the message 601 may be at least partially overlaid over the indication of the associated content (in this example, the message 601 is partially overlaid over the box representing Content 102-2 and over the cursor 401). In other examples, the message 601 may be at a location that is a predetermined (e.g., fixed) distance from the indication of the item of content and/or from the cursor 401, rather than being overlaid on the indicated item of content and/or on the cursor 401. Also, in this example, the message 601 may be selectively displayed whenever the item Content 102-2 is included in the displayed interface or only in response to the cursor 401 highlighting the item Content 102-2. While the examples of FIGS. 5 and 6 include messages 501, 601 that only generically indicate that supplemental content is available, the messages 501, 601 may additionally or alternatively include more detailed information about the supplemental content that is available. As will be described in more detail below, these messages (e.g., the messages 501 and 601) may be user-selectable.

After adding any indications in step 306, the process may then move to step 307, in which the interface as set forth by the display window data set may be generated for display by a display device (e.g., by the display device 206) as described above.

While the interface is being displayed by the display device at step 307, user input for browsing through the interface may be received by the user device. Examples of such browse user input may include moving the cursor 401 (e.g., up, down, left or right), paging and/or scrolling through the interface, and/or any other type of user input intended to change which portion of the interface information is to be displayed (e.g., by changing which service listings and/or timeframe are to be included in the displayed interface). In response to browse user input, the process may move back to step 301 for re-evaluation as to what information is to be displayed by the interface. When step 307 is once again reached, the displayed interface may be refreshed with an updated version of the displayed interface as modified in accordance with the browse user input. For example, while the interface of FIG. 4 is being displayed, a user input for moving the cursor 401 down may be received. In response to the user input, the process may move to step 301. When the process again arrives at step 307, the updated interface may be displayed such as in FIG. 5, in which the cursor 401 is in the new position in accordance with the user input. As can also be seen in FIG. 5, moving the cursor 401 down to highlight Content 102-2 may result in a decision at step 306 to add the message 501 associated with the highlighted Content 102-2.

Other user inputs may also be received by the user device during step 307. For example, the user may provide a user input to select a particular program and/or service indicated by the interface for tuning to, or for recording, or for obtaining further information about the program and/or service. Or, the user input may be an input that selects a particular option or proposal, such as by responding to a proposal for a supplemental service (for instance, by selecting or otherwise responding to the message 501 or the message 601). Or, the user input may be an input for exiting the interface. Many other user inputs are possible.

Referring to FIG. 3B, if a user input is received during the displaying of the interface, then at step 308, the user device and/or a device of the network may determine the nature or type of the user input. If the user input is determined to be a user input for initiating (e.g., tuning to, opening, or executing) a particular service (e.g., by highlighting a current program of that service using the cursor 401 and then making a selection of that program), then the process may move to step 309, and the selected service may be initiated by the user device, and/or by another device such as to provide a second screen experience. Or, if the user input is determined to be a request to exit the interface, then the interface may no longer be displayed.

If the user input is determined to be a selection in response to a proposal for adding a listing of an indicated supplemental service to the interface, then the process may move to step 311. At step 311, the user device and/or a device of the network may determine, generate, and/or cause to be displayed a user interface through which the user may install one or more supplemental services to the device. An example of such a user interface is shown in FIGS. 14 and 15, which will be described in more detail below. If the user installs one or more supplemental services as determined at step 312, then those supplemental service(s) are added, and the process may return to step 301 for re-evaluation as to how the interface is to be displayed. A supplemental service data set may be established and updated by the user device and/or a device of the network that identifies the services that have been installed for each user and/or for each device. Thus, when a user adds a supplemental service, the supplemental service may be added to the supplemental service data set associated with the user.

Further examples of various interface features are described below. As shown in FIG. 4, the interface may be displayed with the cursor 401 highlighting a particular item of content, in this case Content 101-2. While the cursor 401 is shown in this example as a thick line surrounding the indicated item of content, the cursor 401 may take any form, such as but not limited to a colored highlight or background, a change in font size and/or format, a three-dimensional (e.g., shadow box) effect, an animation, etc. In response to a user input to move the cursor 401 down, the interface may be refreshed to be as shown in FIG. 5 or FIG. 6. In these examples, the cursor 401 is now highlighting an item of content of the service on the next row downward, which in this case is Content 102-2. Also, in response to the user input moving the cursor 401 down, at step 306 it is determined that there is at least one item of supplemental content associated with Content 102-2. As described previously, this may be determined by, for instance, comparing the highlighted item of content with the supplemental content data set to determine whether any of the items of content and/or services listed in the display window data set are associated with any supplemental content. If so, then one or more messages (e.g., the message 501 or the message 601) may be added to the display window data set for inclusion in the refreshed interface that is displayed at step 307. If the cursor 401 is then moved to select (e.g., highlight) an item of content that is not associated with any supplemental content, then the message 501 or 601 may not be displayed. Or, if the cursor is moved to an item of content (e.g., Content 102-1) having associated supplemental content (as in FIG. 7 or 8), then another message (e.g., the message 701 or the message 801) may be displayed indicating that supplemental content is available for the currently-selected item of content.

In further examples, a stored and/or predetermined user profile may indicate what types of supplemental content are of interest to the user, and the decision as to whether to display such message (e.g., the message 501 or 601) may further depend on the content of the user profile. For instance, the message 501 or 601 may only be displayed if the cursor 401 is selecting an item of content that has supplemental content that is indicated by the user profile as being a type of supplemental content of interest to the user. The user profile may be user-defined and/or otherwise determined based on, for example, historical selections of items of content and/or items of supplemental content.

Figure 9:
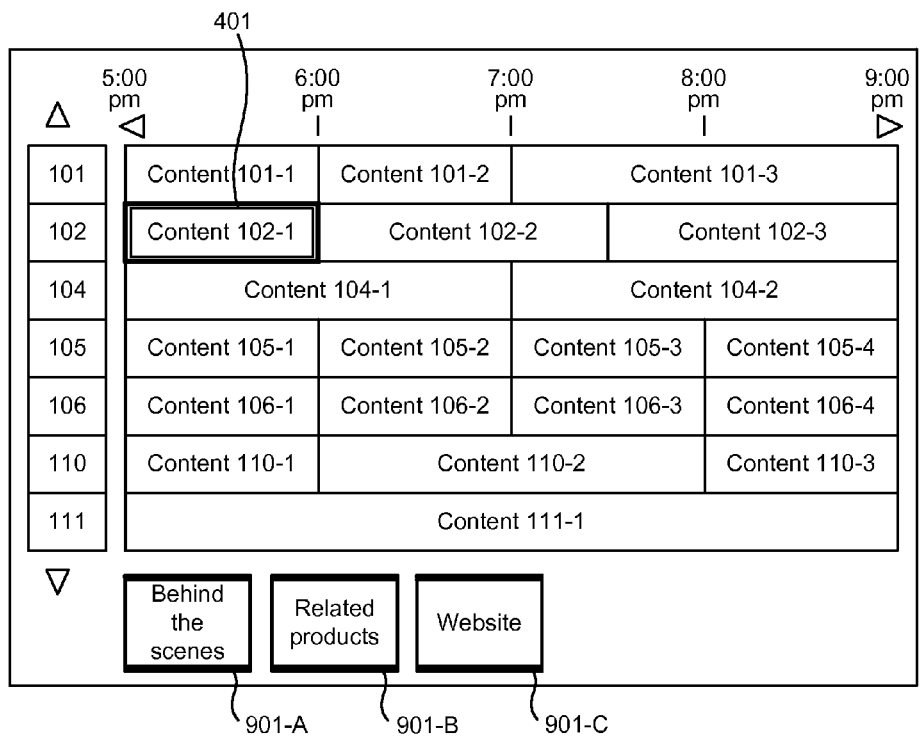
FIG. 9 shows an example interface in accordance with one or more aspects as described herein.
Figure 10:
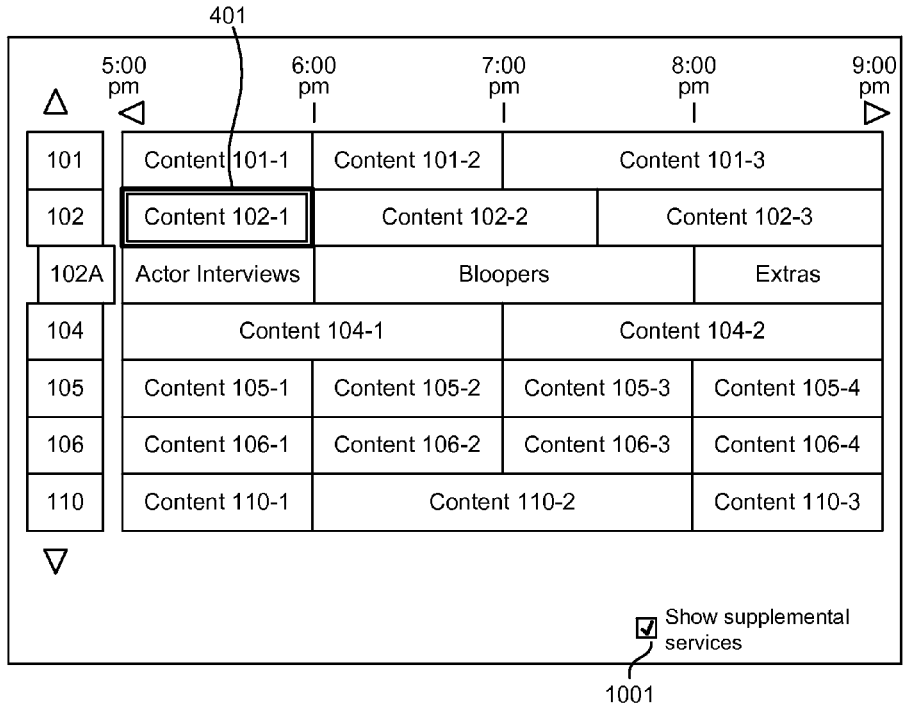
FIG. 10 shows an example interface in accordance with one or more aspects as described herein.
Figure 11:
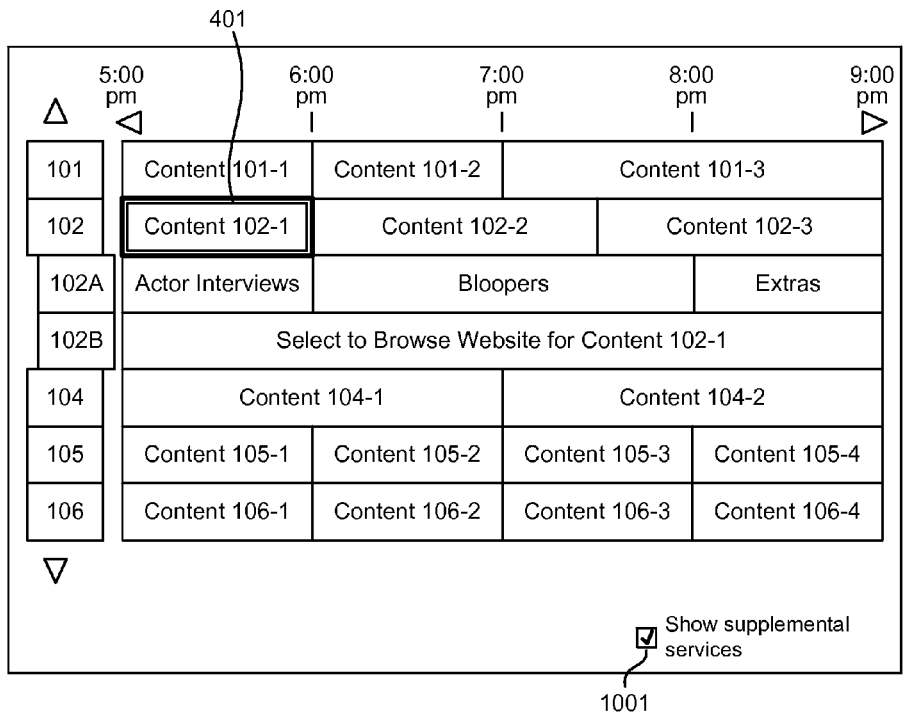
FIG. 11 shows an example interface in accordance with one or more aspects as described herein.
Figure 12:
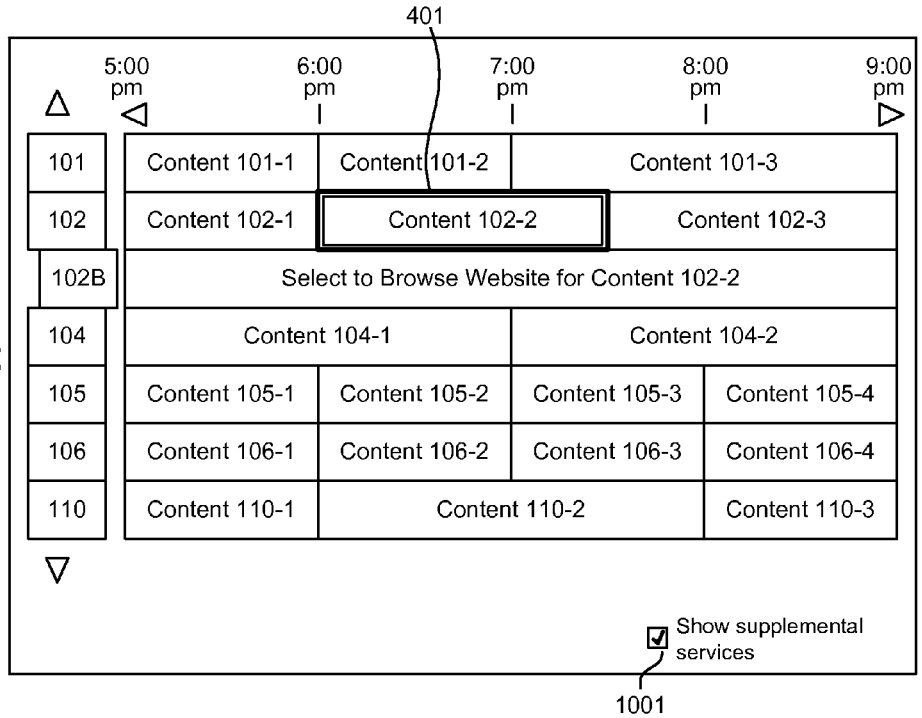
FIG. 12 shows an example interface in accordance with one or more aspects as described herein.

FIG. 9 shows another example of how supplemental content may be indicated to a user. In this example, Content 102-1 is being highlighted by the cursor 401, and particular items of supplemental content are indicated by messages 901-A, 901-B, and 901-C. While three items of supplemental content are indicated in this example, there may be fewer or greater items of supplemental content. The screen of FIG. 9 may be displayed responsive to the cursor moving to highlight Content 102-1, or it may be displayed responsive to the user selecting or otherwise responding to the message 701 or the message 801. In either case, the user may be able to select one of the indicated messages 901 to indicate interest in the supplemental content.

In the present example, assume that the user selects "Behind the scenes" message 901-A. In response, the interface may appear as shown, for example, in FIG. 10, in which an additional service number 102A may be presented to the user. Service number 102A may be a supplemental information service that provides supplemental content associated with the selected "Behind the scenes" message 901-A. Assuming that the user further selects the "Website" message 901-C, then the interface may appear as shown, for example, in FIG. 11 to also list another supplemental service such as supplemental service number 102B.

The user may tune to, record, and/or navigate the cursor 401 to any items of content in supplemental service number(s) 102A and/or 102B, just as the user might do for any of the other services. Moreover, the supplemental services may be displayed at locations in the interface that are context-dependent. For example, because supplemental service number 102A is associated with Content 102-1, supplemental service number 102A may be presented in the interface at a position that depends upon the position of associated Content 102-1 and/or depends upon the position of the listing for service number 102 (the service that contains Content 102-1). Likewise, because supplemental service number 102B is associated with Content 102-1, supplemental service number 102B may also be listed in the interface at a position that depends upon the position of associated Content 102-1 and/or depends upon the position of the listing for service number 102 (the service that contains Content 102-1). For example, the listing(s) for supplemental service numbers 102A and/or 102B may be positioned in a row of the interface between the listing for service number 102 and the listing for another service, and/or directly adjacent to the listing for service number 102 (e.g., directly above or directly below). While the numbering of supplemental service numbers 102A and 102B in this example implies a relationship between service number 102 (or the content therein) and supplemental service numbers 102A and 102B, supplemental service numbers 102A and 102B need not be identified (e.g., numbered) in such a manner, and may be identified in any manner desired.

Moreover, supplemental services may or may not be listed in the displayed interface depending upon the context, e.g., depending upon what else is included in the displayed portion of the interface. For example, supplemental service numbers 102A and 102B may or may not be included in the displayed interface depending upon whether the associated content and/or the associated service is also included in the displayed interface. For example, supplemental service numbers 102A and/or 102B may only be listed in the displayed interface if associated service number 102 is also listed in the displayed interface. Once the user scrolls or otherwise reconfigures the interface such that the listing for service number 102 is no longer displayed, service numbers 102A and 102B may also no longer be listed in the interface. Or, supplemental service numbers 102A and 102B may continue to be displayed until the user also scrolls away from the rows containing those supplemental services. As another example, supplemental service numbers 102A and/or 102B may only be included in the displayed interface if the associated item of content (Content 102-1) is also included in the displayed interface. Thus, for instance, if the user scrolls in time such that Content 102-1 is no longer displayed in the interface (even though the listing for service number 102 may continue to be displayed in the interface), then supplemental service numbers 102A and/or 102B may no longer be included in the displayed interface. As yet another example, the listings for supplemental service numbers 102A and/or 102B may only be included in the displayed interface while the listing for associated service number 102 and/or the associated item of content (Content 102-1) is being highlighted or otherwise selected, such as by the cursor 401. If the cursor 401 is moved away from the listing for service number 102 and/or for Content 102-1, then the listings for supplemental service numbers 102A and/or 102B may no longer be included in the displayed interface.

Since a supplemental service may be associated with one or more particular items of content (instead of or in addition to being associated with another service), the supplemental service may display one or more items of supplemental content therein that may depend upon whether the associated item of content is being highlighted or otherwise selected by the cursor 401 and/or that currently appears in the interface being displayed. Thus, in addition to the displaying of listings of supplemental services being context-sensitive, the description of listings of content items in supplemental services may also be context-sensitive. For example, assume that supplemental service number 102A is associated with content 102-1, that supplemental service number 102B is associated with service number 102, and that the user moves the cursor 401 from Content 102-1 as in FIG. 11 to Content 102-2 as in FIG. 12. In this example, supplemental service number 102A (associated with content 102-1) may disappear form the displayed interface because Content 102-1 is no longer selected. Moreover, the listing for supplemental service number 102B (associated with s 102) may remain, and the content described for supplemental service number 102B may change to reflect the fact that Content 102-2 is currently selected. In this example, when Content 102-1 was selected, then supplemental service number 102B has content described as "Select to Browse Website for Content 102-1." If the user has selected (e.g., tuned to) service number 102B at that point (such as by moving the cursor 401 down to service number 102B and pressing a select button on the remote control), then the user may have been directed via a web browser to the website for Content 102-1. Now, once the cursor 104 has been moved to select Content 102-2, supplemental the listing for service number 102B includes a listing of content described as "Select to Browse Website for Content 102-2." If the user has selected (e.g., tuned to) service number 102B at that point (such as by moving the cursor 401 down to service number 102B and pressing a select button on the remote control), then the user may have been directed via a web browser to the website for Content 102-2.

Figure 13:
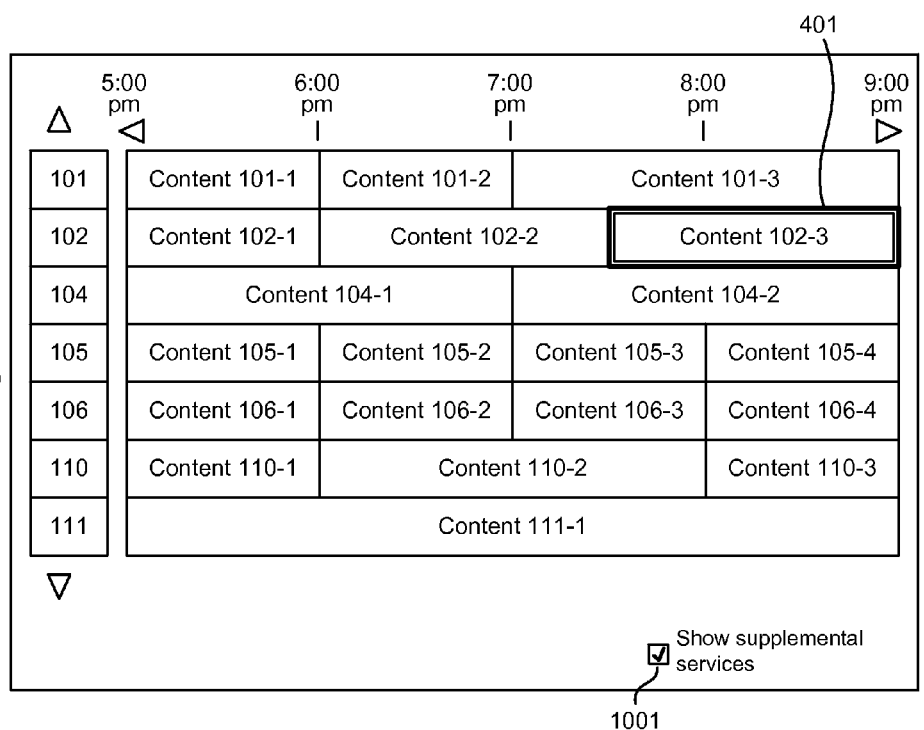
FIG. 13 shows an example interface in accordance with one or more aspects as described herein.
Figure 14:
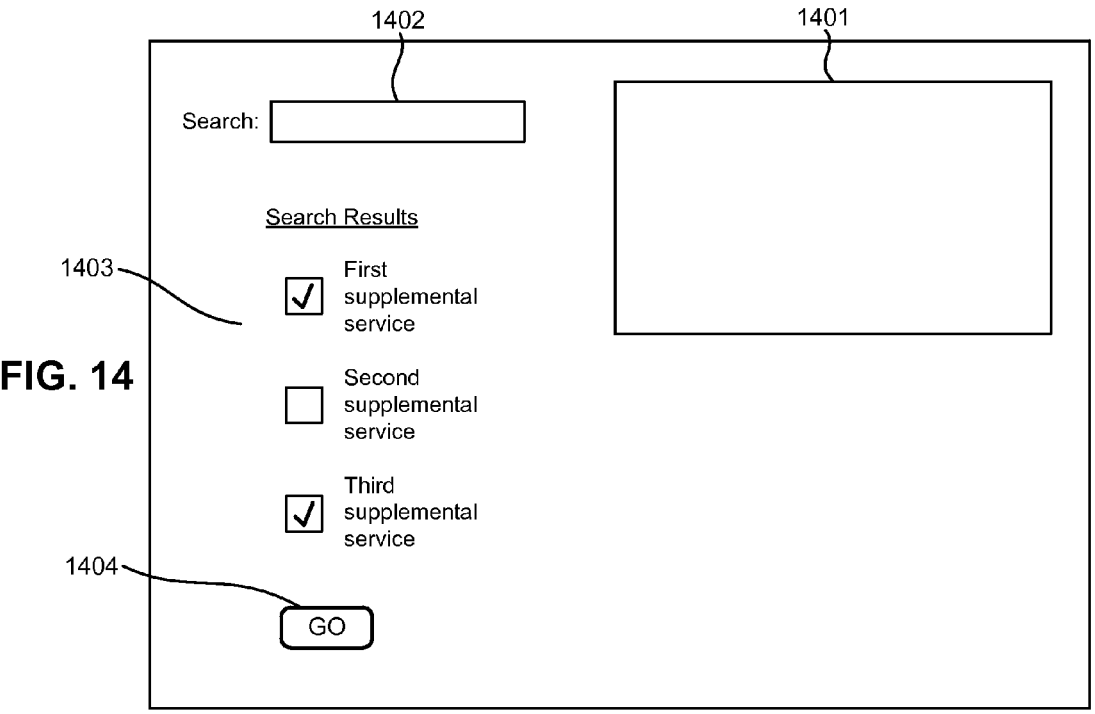
FIG. 14 shows an example interface in accordance with one or more aspects as described herein.

As shown in FIG. 13, if the cursor 401 is again moved to now select Content 102-3, then in this example, no supplemental services are included in the displayed interface, because no supplemental services are associated with Content 102-3. Also, in this example, there may be no website for Content 102-3, and so supplemental service number 102B may no longer be included in the displayed interface.

At steps 311 and 312 of the flow chart of FIG. 3B, selecting a proposed supplemental service indication (e.g., indications 501, 601, 701, 801, 901-A, 901-B, or 901-C) may result in a supplemental service selection user interface being presented (e.g., displayed). An example of such a resulting user interface is shown in FIG. 14. In this example, the user interface may include a window 1401 indicating the content being presented in a currently-tuned to service (if at all), a search input box 1402, and a set of search results 1403. The search results 1403 may automatically include results related to the service and/or content previously highlighted (e.g., in FIG. 13, service number 102 and/or Content 102-3). The user may also manually enter a search, if desired, in search input box 1402. In this example, three search results are generically shown. The search results may include suggested supplemental services and/or other items. The search results may be displayed in any format and may include a name and/or description of each search result. The user may indicate which supplemental service is desired to be added, such as, in this example, by selecting/deselecting a check box next to the appropriate search results. Once the desired search results (supplemental services, in this example) are selected, the user may select a go button 1404 or provide some other indication that the selection is ready to be submitted.

Figure 15:
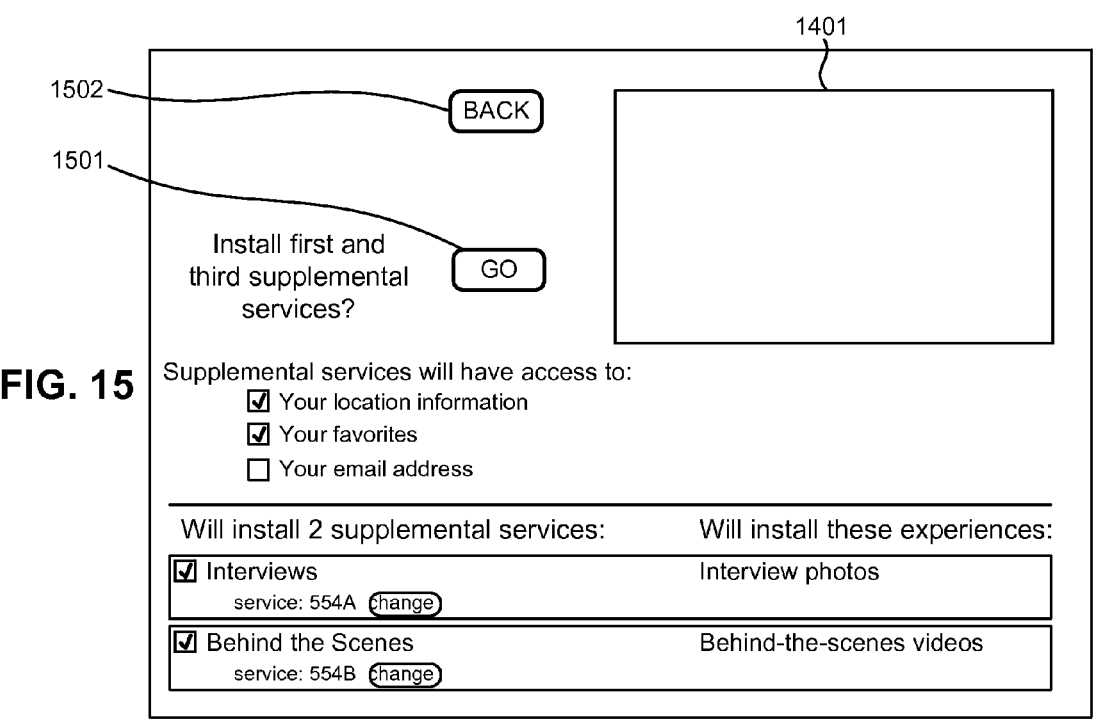
FIG. 15 shows an example interface in accordance with one or more aspects as described herein.

As shown in the example of FIG. 15, once the user has submitted the selection of search results, the user interface may verify the selection. In this example, the user has selected the first and third supplemental services. The user interface may also provide information about the selected supplemental services. For example, the user interface in the example of FIG. 15 indicates to the user that the selected supplemental services will have access to the user's location information (e.g., the location of one or more of the user's devices) and the user's favorites information (which may be stored in a predetermined user profile). In addition, the example user interface may identify to the user which supplemental services have been selected (in this example, Interviews and Behind the Scenes supplemental services), what service numbers are to be assigned to each supplemental service (in this example, the default is service numbers 554A and 554B, which may be changed by the user if desired), and an indication of what multimedia experiences will be installed by the supplemental services (in this example, interview photos and behind-the-scenes videos). If the user approves, then the user may select a go button 1501 or provide some other indication of approval. Otherwise, the user may select a back button 1502 or provide some other indication of a desire to edit the user's selection.

Upon selection of the go button 1501, the process of FIGS. 3A and 3B may return to step 301, and as a result the display may return to the interface, such as shown in FIG. 16. As can now be seen, the interface may include the newly-added supplemental service numbers 554A and 554B. The interface may continue to operate such as in the manner described above with reference to the preceding figures.

The various features described above are merely non-limiting examples, and can be rearranged, combined, subdivided, omitted, and/or altered in any desired manner. For example, features of the servers can be subdivided among multiple processors and computing devices. The true scope of this patent should only be defined by the claims that follow.

What is claimed is:

1. A method, comprising:
    generating for display, by at least one computing device, an interface indicating at least a plurality of items of scheduled content of a plurality of services, wherein the plurality of items of scheduled content comprises a first item of scheduled content;
    determining, responsive to a user selection from the interface of the first item of scheduled content, whether the first item of scheduled content is associated with another one or more services not included in the plurality of services; and responsive to determining that the first item of scheduled content is associated with the another one or more services, updating the interface to indicate at least one item of content of the another one or more services simultaneously with the plurality of items of scheduled content.

2. The method of claim 1, wherein the generating for display comprises generating for display the interface to comprise a grid of at least some of the items of scheduled content, wherein the grid is configured such that a listing of the at least some of the plurality of services and the another one or more services is arranged along a first axis and a listing of a window of time is arranged along a different second axis.

3. The method of claim 1, wherein the at least one item of content of the another one or more services is an item of scheduled content.

4. The method of claim 1, wherein the generating for display comprises generating a signal suitable for use by a display device, separate from the at least one computing device, to display the interface.

5. The method of claim 1, wherein the generating for display comprises generating a signal suitable for use by a display device, integrated with the at least one computing device, to display the interface.

6. A method, comprising:
receiving, by at least one computing device, user input to an interface, the user input selecting a first item of content associated with a first service, the interface identifying at least a plurality of items of content, including the first item of content, associated with a plurality of services; and
in response to the user input selecting the first item of content:
determining, by the at least one computing device, a different second item of content of a different second service not indicated by the interface based at least in part on the first item of content; and
updating, by the at least one computing device, the interface to indicate the plurality of items of content simultaneously with the second item of content.

7. The method of claim 6, wherein the first item of content is an item of scheduled content.

8. The method of claim 6, wherein the updating comprises generating for display the interface to comprise a grid of the plurality of items of content, wherein the grid is configured such that a listing of the plurality of services is arranged along a first axis and a listing of a window of time is arranged along a different second axis.

9. The method of claim 6, further comprising:
receiving, by the at least one computing device, a user selection of a third item of content of the first service;
determining, by the at least one computing device, a different fourth item of content of the different second service based at least in part on the third item of content; and
updating, by the at least one computing device, the interface to indicate at least some of the plurality of items of content associated with at least some of the plurality of services including the third and fourth items of content and the first and second services.

10. The method of claim 9, wherein the first and third items of content are each an item of scheduled content that are scheduled at different times on the first service.

11. The method of claim 9, wherein the interface is arranged to simultaneously indicate both the first and third items of content.

12. The method of claim 6, wherein the determining comprises determining whether the first item of content is associated with the second item of content.

13. The method of claim 6, wherein the determining comprises determining whether the first service is associated with the second service.

14. A method, comprising:
generating, by at least one computing device, an interface that indicates at least a plurality of items of content including a first item of content, wherein the plurality of items of content are associated with a plurality of services including a first service, and wherein the first item of content is scheduled on the first service;
receiving, by the at least one computing device, a first user input to highlight the first item of content;
responsive to the first user input, determining, by the at least one computing device, a second service not indicated by the interface, the second service being based at least in part on the first item of content; and
generating, by the at least one computing device, an updated interface to indicate the second service simultaneously with the plurality of items of content.

15. The method of claim 14, wherein the generating the updated interface comprises generating for display the updated interface to comprise a grid of the plurality of items of content, wherein the grid is configured such that a listing of the plurality of services is arranged along a first axis and a listing of a window of time is arranged along a different second axis, and to indicate the second service as an overlay over at least a portion of the grid.

16. The method of claim 14, wherein the generating the updated interface comprises generating for display the updated interface to comprise a grid of the plurality of items of content, wherein the grid is configured such that the plurality of services are arranged along a first axis and a window of time is arranged along a different second axis, and to indicate the second service outside of the grid.

17. The method of claim 14, further comprising:
receiving a second user input selecting an indication in the interface of the second service,
wherein the generating the updated interface comprises generating for display the updated interface, after the receiving of the second user input, to comprise a grid of the plurality of items of content, wherein the grid is configured such that the plurality of services and the second service are arranged along a first axis and a window of time is arranged along a different second axis.

18. The method of claim 14, wherein the determining the second service comprises determining the second service based at least in part on the first service.

19. The method of claim 14, further comprising highlighting the first item of content in response to the first user input.

20. The method of claim 19, wherein the highlighting comprises moving a cursor of the interface to the first item of content.

* * * * *